United States Patent
Olgaard

(10) Patent No.: US 9,088,521 B2
(45) Date of Patent: Jul. 21, 2015

(54) SYSTEM AND METHOD FOR TESTING MULTIPLE DATA PACKET SIGNAL TRANSCEIVERS CONCURRENTLY

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 146 days.

(21) Appl. No.: 13/772,422

(22) Filed: Feb. 21, 2013

(65) Prior Publication Data

US 2014/0233405 A1 Aug. 21, 2014

(51) Int. Cl.
*H04L 12/26* (2006.01)

(52) U.S. Cl.
CPC ............ *H04L 43/50* (2013.01); *H04L 12/2697* (2013.01); *H04L 12/26* (2013.01)

(58) Field of Classification Search
None
See application file for complete search history.

(56) References Cited

U.S. PATENT DOCUMENTS

| | | | |
|---|---|---|---|
| 7,143,015 B1 | 11/2006 | Preuss | |
| 7,567,521 B2 * | 7/2009 | Olgaard et al. | 370/252 |
| 8,155,175 B2 * | 4/2012 | Olgaard | 375/225 |
| 2002/0105907 A1 | 8/2002 | Bruekers et al. | |
| 2006/0252419 A1 * | 11/2006 | Liu | 455/423 |
| 2007/0036208 A1 * | 2/2007 | Olgaard | 375/225 |
| 2007/0206543 A1 | 9/2007 | Becker et al. | |
| 2007/0280196 A1 * | 12/2007 | Olgaard et al. | 370/351 |
| 2007/0294378 A1 * | 12/2007 | Olgaard et al. | 709/223 |
| 2008/0172588 A1 * | 7/2008 | Olgaard | 714/742 |
| 2009/0061782 A1 * | 3/2009 | Olgaard | 455/67.14 |
| 2009/0092053 A1 * | 4/2009 | Olgaard | 370/241 |
| 2010/0008237 A1 * | 1/2010 | Olgaard et al. | 370/249 |
| 2010/0123471 A1 * | 5/2010 | Olgaard et al. | 324/754 |
| 2010/0183101 A1 | 7/2010 | Mundarath et al. | |
| 2010/0261431 A1 * | 10/2010 | Olgaard | 455/67.11 |
| 2011/0069624 A1 * | 3/2011 | Olgaard | 370/252 |
| 2011/0090799 A1 * | 4/2011 | El-Hassan et al. | 370/241 |
| 2011/0096821 A1 * | 4/2011 | Olgaard et al. | 375/224 |
| 2012/0207030 A1 * | 8/2012 | Luong | 370/245 |

FOREIGN PATENT DOCUMENTS

EP 2362550 8/2001

OTHER PUBLICATIONS

International Search Report and Written Opinion in PCT/US2013/071658 issued on Mar. 11, 2014, 12 pages.

* cited by examiner

*Primary Examiner* — Ayaz Sheikh
*Assistant Examiner* — Peter Chau
(74) *Attorney, Agent, or Firm* — Vedder Price, P.C.

(57) ABSTRACT

A system and method for testing multiple data packet signal transceivers concurrently in which scalar and vector signal testing are separated. Concurrent testing of scalar signal characteristics of multiple data packet signals from the data packet signal transceivers can be performed while also performing testing of vector signal characteristics of portions of each of the multiple data packet signals, thereby requiring less test time for performing all desired signal tests.

14 Claims, 6 Drawing Sheets

Time for power measurements is equal to sequence time for 36 packets

SYSTEM AND METHOD FOR TESTING MULTIPLE DATA PACKET SIGNAL TRANSCEIVERS CONCURRENTLY

BACKGROUND

The present invention relates to systems and methods for testing multiple data packet signal transceivers concurrently, and in particular, to testing such devices under test with (DUTs) with minimal test equipment and reduced test time.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such devices, engineers take extraordinary care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal analyzer (VSA) for analyzing signals produced by the device, and a vector signal generator (VSG) for generating signals to be received by the device. The analyses performed by the VSA and the signals generated by the VSG are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of product cost is manufacturing test cost. Typically, there is a direct correlation between the cost of test and the time required to perform such test. Thus, innovations that can shorten test time without compromising test accuracy or increasing capital equipment costs (e.g., increasing costs due to increasing sophistication of test equipment, or testers) are important and can provide significant cost savings, particularly in view of the large numbers of such devices being manufactured and tested.

SUMMARY

In accordance with the presently claimed invention, a system and method are provided for testing multiple data packet signal transceivers concurrently in which scalar and vector signal testing are separated. Concurrent testing of scalar signal characteristics of multiple data packet signals from the data packet signal transceivers can be performed while also performing testing of vector signal characteristics of portions of each of the multiple data packet signals, thereby requiring less test time for performing all desired signal tests.

In accordance with an exemplary embodiment of the presently claimed invention, a test system for testing multiple data packet signal transceivers concurrently includes: first signal analysis circuitry responsive to a plurality of data packet signals from a plurality of data packet signal transceivers by providing one or more first analysis signals indicative of at least a respective scalar signal characteristic of each of the plurality of data packet signals, wherein each of the plurality of data packet signals includes a sequence of a plurality of data packets with respective portions of the sequence having mutually distinct signal characteristics; signal routing circuitry coupled to the first signal analysis circuitry and responsive to the plurality of data packet signals and one or more control signals by providing a routed signal that includes a sequence of respective portions of each of the plurality of data packet signals; and second signal analysis circuitry coupled to the signal routing circuitry and responsive to the routed signal by providing one or more second analysis signals indicative of at least a respective vector signal characteristic of each of the respective portions of each of the plurality of data packet signals.

In accordance with another exemplary embodiment of the presently claimed invention, a method of testing multiple data packet signal transceivers concurrently includes: receiving a plurality of data packet signals from a plurality of data packet signal transceivers, wherein each of the plurality of data packet signals includes a sequence of a plurality of data packets with respective portions of the sequence having mutually distinct signal characteristics; measuring at least a respective scalar signal characteristic of each of the plurality of data packet signals to provide one or more first analysis signals indicative thereof; routing the plurality of data packet signals to provide a routed signal that includes a sequence of respective portions of each of the plurality of data packet signals; and analyzing the routed signal to provide one or more second analysis signals indicative of at least a respective vector signal characteristic of each of the respective portions of each of the plurality of data packet signals.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

The following discussion involves concurrent testing of four DUTs. However, as will be readily appreciated, the system, techniques and principles as discussed below for testing multiple DUTs concurrently in accordance with exemplary embodiments of the presently claimed invention can be scaled up or down for other multiples of DUTs. In other words, two or more DUTs can be tested concurrently in accordance with the presently claimed invention.

Figure 1:
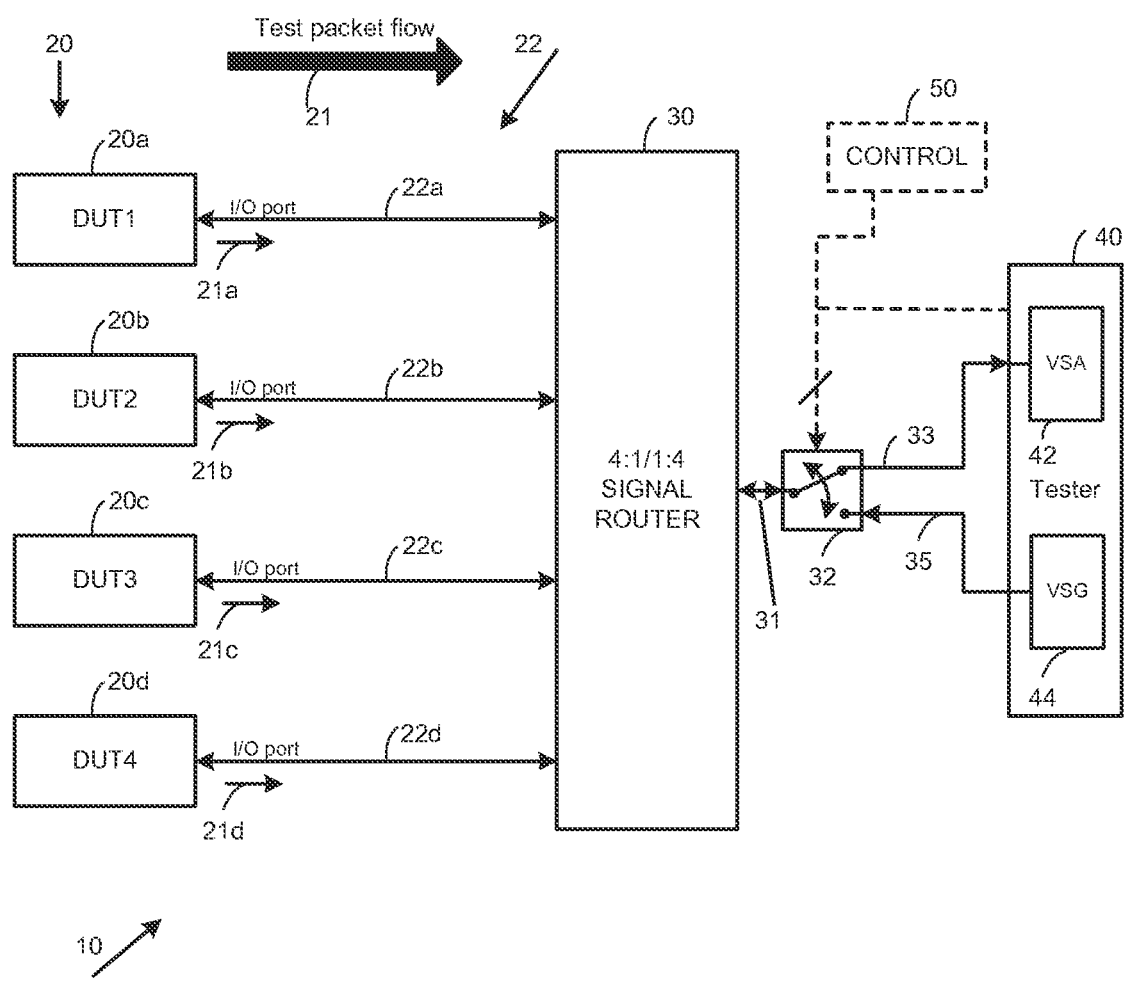
FIG. 1 depicts a test environment for testing multiple data packet signal transceivers.

Referring to FIG. 1, a test environment 10 for testing multiple DUTs 20 includes a Tester 40, which includes a signal source 44 (e.g., a vector signal analyzer, VSG) and a received signal analyzer 42 (e.g., a vector signal analyzer, VSA) and signal routing circuitry 30, 32, which can include first 30 and second 32 signal routing circuits. For example, as discussed in more detail below, the first signal routing circuit 30 can be implemented as one or more, or a combination, of multiplexing, switching, splitting and/or combining circuitry, and the second signal routing circuit 32 can be implemented as signal switching circuitry. (Alternatively, the second signal routing circuit 32 can be included as part of the first signal routing circuit 30. Also, at the DUT side, the first signal routing circuitry 30 preferably includes signal switching circuitry to allow for isolation of the respective DUTs 20a, 20b, 20c, 20d during their parallel, or simultaneous, operations.)

As will be readily appreciated, the DUTs 20 are typically wireless signal transceivers, but the various signal paths 22 between the DUTs 20 and signal routing circuitry 30, 32 are typically cabled signal paths to ensure reliable and substantially lossless signal connections.

As depicted here in this example, the tester 40 includes a signal source 44 and signal analyzer 42, while external circuitry includes the signal routing circuitry 30, 32 and any necessary signal connections (e.g., cables and connectors). Accordingly, the complete test system includes the tester 40 and routing circuitry 30, 32, as well as an external controller 50 as desired or necessary. However, as will be readily appreciated, the tester 40 can also include either or both of the functions and circuitry of the signal routing circuitry 30, 32 and controller 50, as desired.

When performing transmit (TX) testing of the DUTs 20, the signal flow 21 of test data packets is from the DUTs 20 to the first routing circuit 30, with each individual DUT 20a, 20b, 20c, 20d providing its own respective test data packet signal 21a, 21b, 21c, 21d via its own respective cabled test connection 22a, 22b, 22c, 22d. For this forward signal flow, the first signal routing circuit 30 multiplexes (or switches) these signals 21a, 21b, 21c, 21d to provide a multiplexed signal 31, which is routed via the switch 32 and switch connection 33 to the received signal tester 42 in the tester 40.

Figure 2:
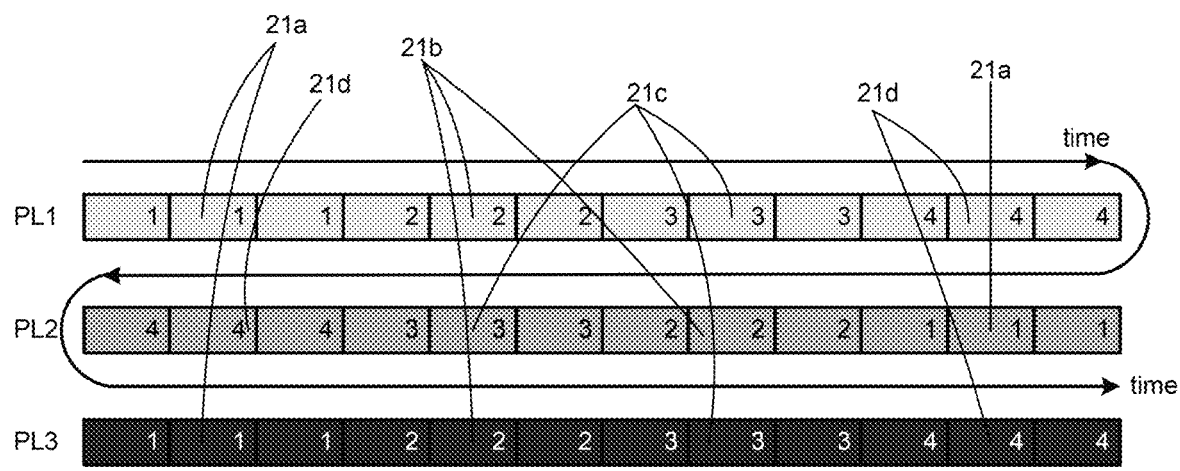
FIG. 2 depicts data packet signal flow for the test environment of FIG. 1.

Referring to FIG. 2, a typical TX test for the DUTs 20 includes the transmission by each DUT 20a, 20b, 20c, 20d of a sequence of three test data packet signals 21a, 21b, 21c, 21d at each of three signal power levels PL1, PL2, PL3. The signal routing circuit 30 multiplexes these into a single signal sequence, which includes a total of 36 test data packets, as shown. Hence, while these four DUTs 20 can be connected concurrently, testing of their respective signal characteristics cannot be done concurrently due to the need for multiplexing all four test signals 21a, 21b, 21c, 21d into a single multiplexed test signal 31 for analysis by the received signal analyzer 42.

When performing received (RX) signal tests of the DUTs 20, such testing can be done concurrently. The tester signal source 44 provides a test signal 35 which is routed to the first signal routing circuit 30 via the switch 32. The first signal routing circuit 30 replicates this signal 35 (e.g., by splitting or power dividing the signal 35 in accordance with well-known techniques). As a result, this test signal 35 is replicated as four corresponding received test signals for the DUTs 20, which receive these replicated test signals and perform the desired RX testing concurrently. Hence, RX testing of multiple DUTs 20 can be accomplished in substantially the same amount of time as testing of a single DUT 20.

As discussed in more detail below, and as noted above, one way of minimizing test equipment costs is to use testers having a single signal source (VSG) adapted for testing multiple DUTs. As noted above, this can be done by applying the source signal to a signal replicator so that replicated test signals can be applied to multiple DUTs at one time, thereby allowing RX testing of multiple DUTs to be done in parallel, e.g., concurrently. With respect to TX testing of multiple DUTs, while some TX signal analyses, such as error vector magnitude (EVM), require the functionality and performance of a VSA, other TX signal analyses can be performed using simpler test equipment. For example, performing tests for scalar signal characteristics, such as signal power, can be done using simpler and less costly signal measurement subsystems, while testing for vector signal characteristics is performed by the VSA. (For purposes of this discussion. "scalar" signal characteristic refers to those signal characteristics having a single signal parameter to be measured, e.g., a magnitude-only parameter such as signal power, while "vector" signal characteristic refers to those signal characteristics having multiple signal parameters to be measured, e.g., EVM for which signal magnitude and phase are to be measured and/or spectral mask for which power is measured over a selected bandwidth.)

In accordance with exemplary embodiments of the presently claimed invention, power-related measurement and analysis for performing TX testing of multiple DUTs can be performed separately from test functions of the shared VSA, thereby allowing the use of lower cost power-measurement subsystems to do such power-related measurement and analyses in parallel. In accordance with one embodiment, test signals transmitted by the multiple DUTs are attenuated, multiplexed and conveyed to a VSA subsystem while, concurrently, the DUT TX signals have their respective analog signal power levels detected, measured and analyzed by one or more power measurement subsystems. This allows the testing environment to perform power measurements in parallel with other sequential (e.g., multiplexed signal) analyses performed by the VSA, such as EVM analyses. As a result, less test time is required.

In accordance with another embodiment, parallel measurements of test data packet signals can be made at different power levels, thereby allowing power-level averaging and analyses across several power levels to be done concurrently with a sequential VSA signal analysis, such as EVM analysis. Again, this results in shorter test times.

Figure 3:
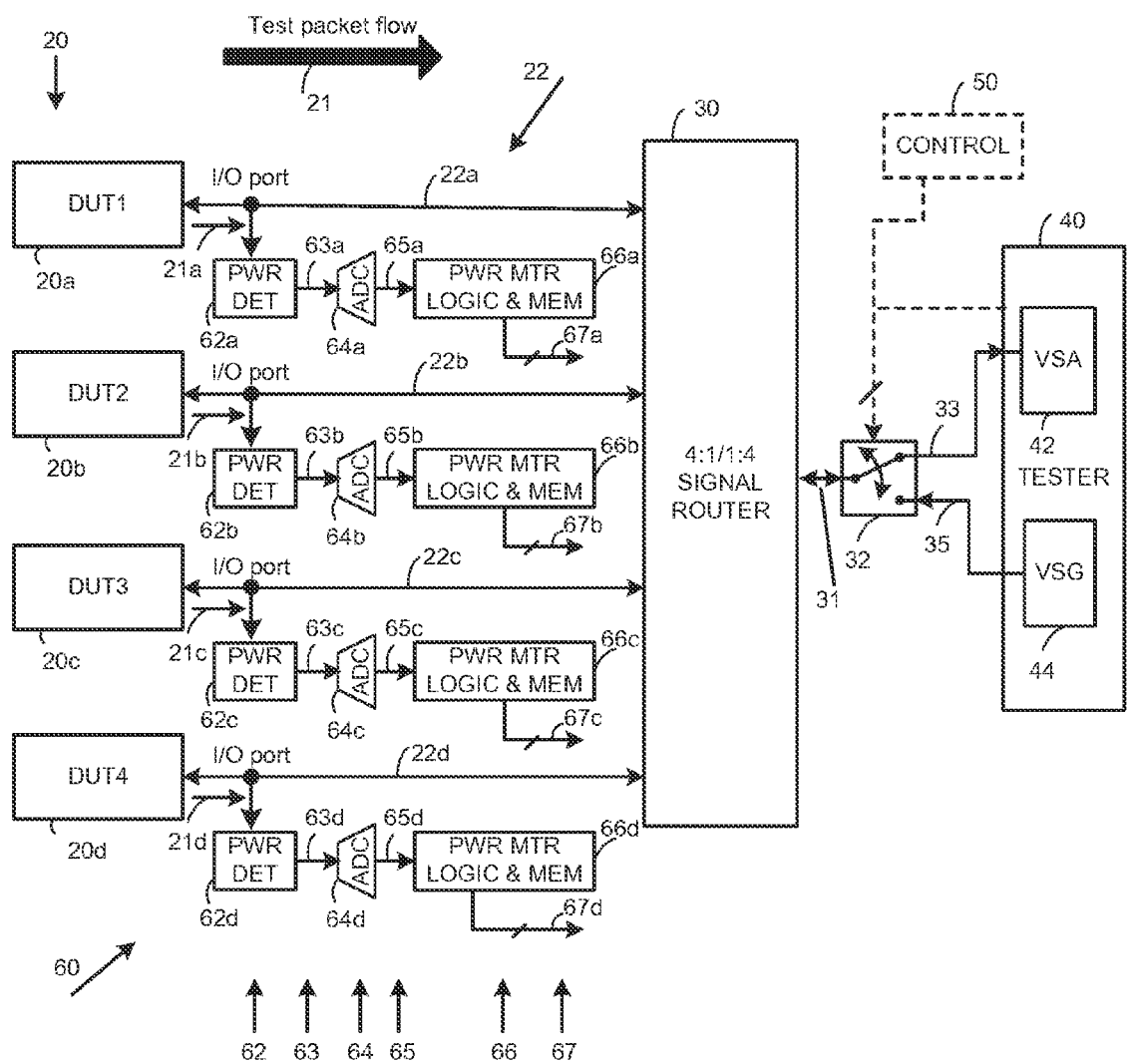
FIG. 3 depicts a test environment for testing multiple data packet signal transceivers concurrently in accordance with exemplary embodiments of the presently claimed invention.

Referring to FIG. 3, in accordance with exemplary embodiments of the presently claimed invention, additional signal testing circuitry 62, 64, 66 is added to the test environment 60 for performing analyses of one or more scalar signal characteristics, such as power measurement, of the TX signals 21a, 21b, 21c, 21d from the DUTs 20a, 20b, 20c, 20d. Such testing can be performed concurrently with each other, as well as concurrently with testing of vector signal characteristics, such as EVM, by the tester 40 (discussed in more detail below).

For example, in accordance with an exemplary embodiment, measuring the power level of each DUT signal 21a, 21b, 21c, 21d is performed by a respective power detector 62a, 62b, 62c, 62d, which produces an analog power detection signal 63a, 63b, 63c, 63d. These signals 63 are converted by respective analog-to-digital converters (ADCs) 64a, 64b, 64c, 64d, which produce corresponding digital power detection signals 65a, 65b, 65c, 65d. The data contained in these detected power detection signals 65 are analyzed by respective power meter logic circuits 66a, 66b, 66c, 66d, which may also include memory circuits to store the results. For example, as will be clear to those skilled in the art, the power meter logic circuits 66a, 66b, 66c, 66d can be used to identify individual data packets and time slots and measure signal power at specified points within specified data packets and/or time slots. Further, sequencing capabilities can be incorporated as part of the power meter logic circuits 66a, 66b, 66c, 66d as well. Additionally, the resulting measured power data can be provided as respective measured power data signals 67a, 67b, 67c, 67d, which can be provided to the tester 40 or external controller 50 for storage and/or further analysis.

Figure 4:
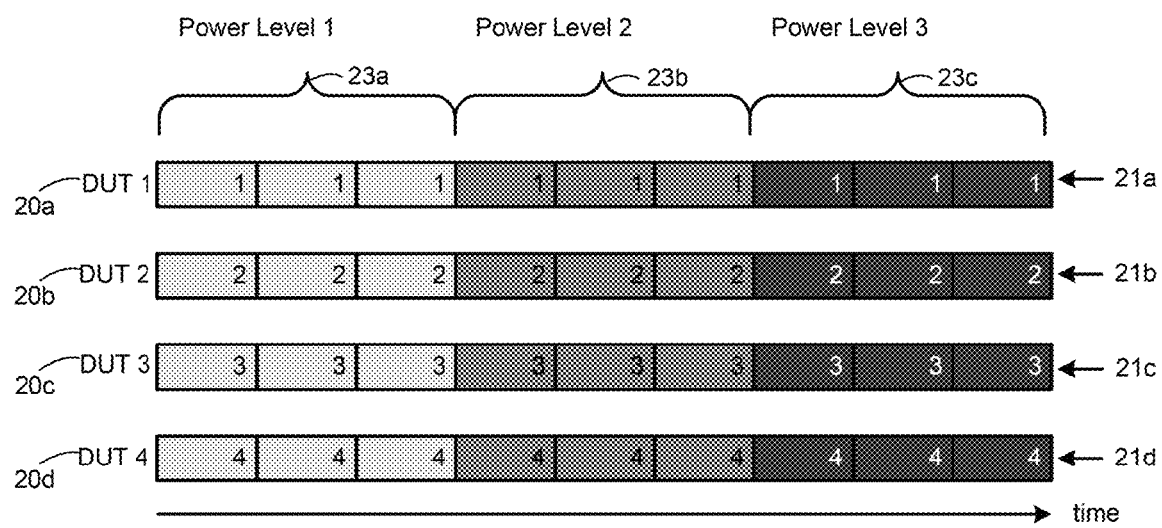
FIG. 4 depicts data packet signal flow for the test environment of FIG. 3.

Referring to FIG. 4, in accordance with an exemplary embodiment, each DUT 20a, 20b, 20c, 20d transmits its TX test signal 21a, 21b, 21c, 21d with multiple data packet sub-sequences (e.g., three data packets), each of which is transmitted at its own respective power level 23a, 23b, 23c. As discussed above, these test data packet sequences 21a, 21b, 21c, 21d are measured for signal power level by their respective portions of the power measurement circuitry 62, 64, 66. Such power level testing can be performed concurrently, thereby requiring the time equivalent of fewer test data packet sub-sequences, e.g., only nine data packet time intervals in this example. This is in contrast to the 36 data packet time intervals required (FIG. 2) when such power level measurements must be performed using the multiplexed signal 33 provided to the tester 40. (As will be appreciated by those skilled in the art, the power meter logic circuits 66a, 66b, 66c, 66d will preferably include capabilities to record time information, e.g., in the form of time stamp measurements, for use in subsequent analysis of the measured power data. Alternatively, sequencing logic can be included to separate the measurement data and/or reports for each measured segment, e.g., average, minimum and maximum.)

Figure 5:
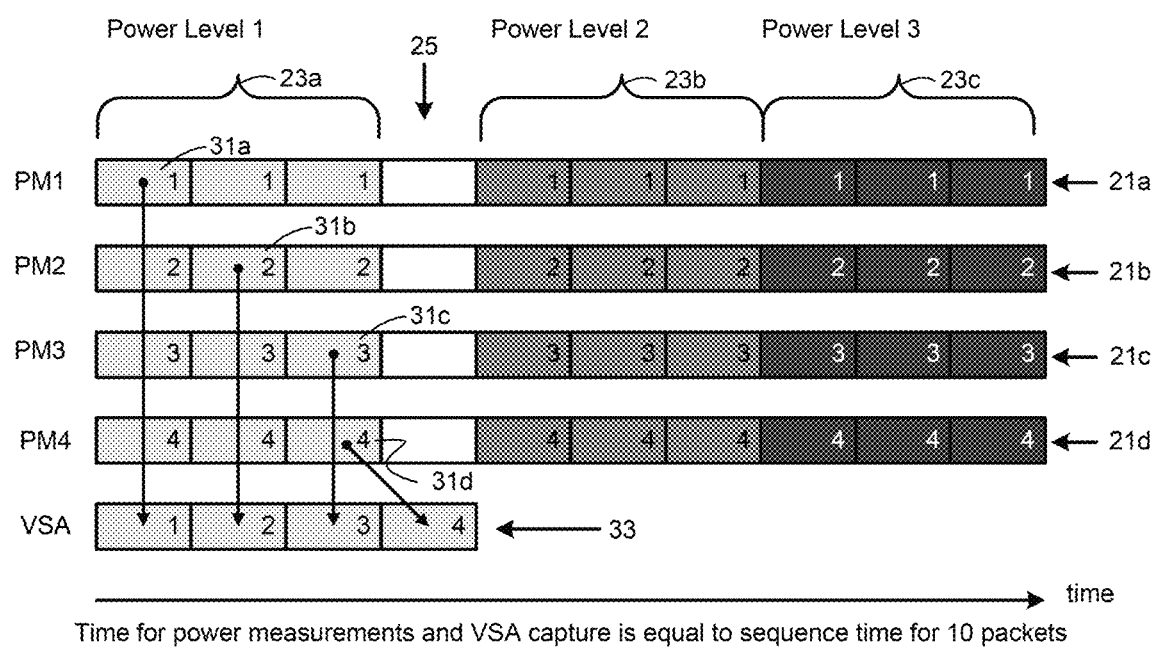
FIG. 5 depicts another data packet signal flow for the test environment of FIG. 3.

Referring to FIG. 5, in accordance with another exemplary embodiment, more thorough testing of the DUTs 20 (e.g., for both scalar and vector signal characteristics) can be achieved with the addition of an additional sub-sequence time interval 25 (e.g., one additional data packet time interval). This allows the power measurements PM1, PM2, PM3, PM4 of the DUT TX signal sequences 21a, 21b, 21c, 21d to be performed at the multiple power levels 23a, 23b, 23c, as discussed above, while also allowing time for the multiplexed test data packet signal 33 to be provided to the VSA 42 within the tester 40, with such multiplexed data packet signal 33 containing at least one data packet sub-sequence (e.g., one data packet) from each DUT 20a, 20b, 20c, 20d. Hence, only one additional data packet sub-sequences (e.g., a total of ten in this example) are needed for performing full TX signal testing, as compared to the 36 data packet sub-sequences (FIG. 2) required by the previous test environment 10 (FIG. 1).

For purposes of this example, the first power level 23a, is preferably the highest power level, which should ensure accurate verification of the EVM for each DUT 20a, 20b, 20c, 20d. Also, the last test data packet sub-sequence 31d at the first power level 23a within the last test data packet sequence 21d can be stored temporarily in memory circuitry within the first routing circuit 30 to enable its being multiplexed with the other corresponding test data packet sub-sequences 31a, 31b, 31c.

Figure 6:
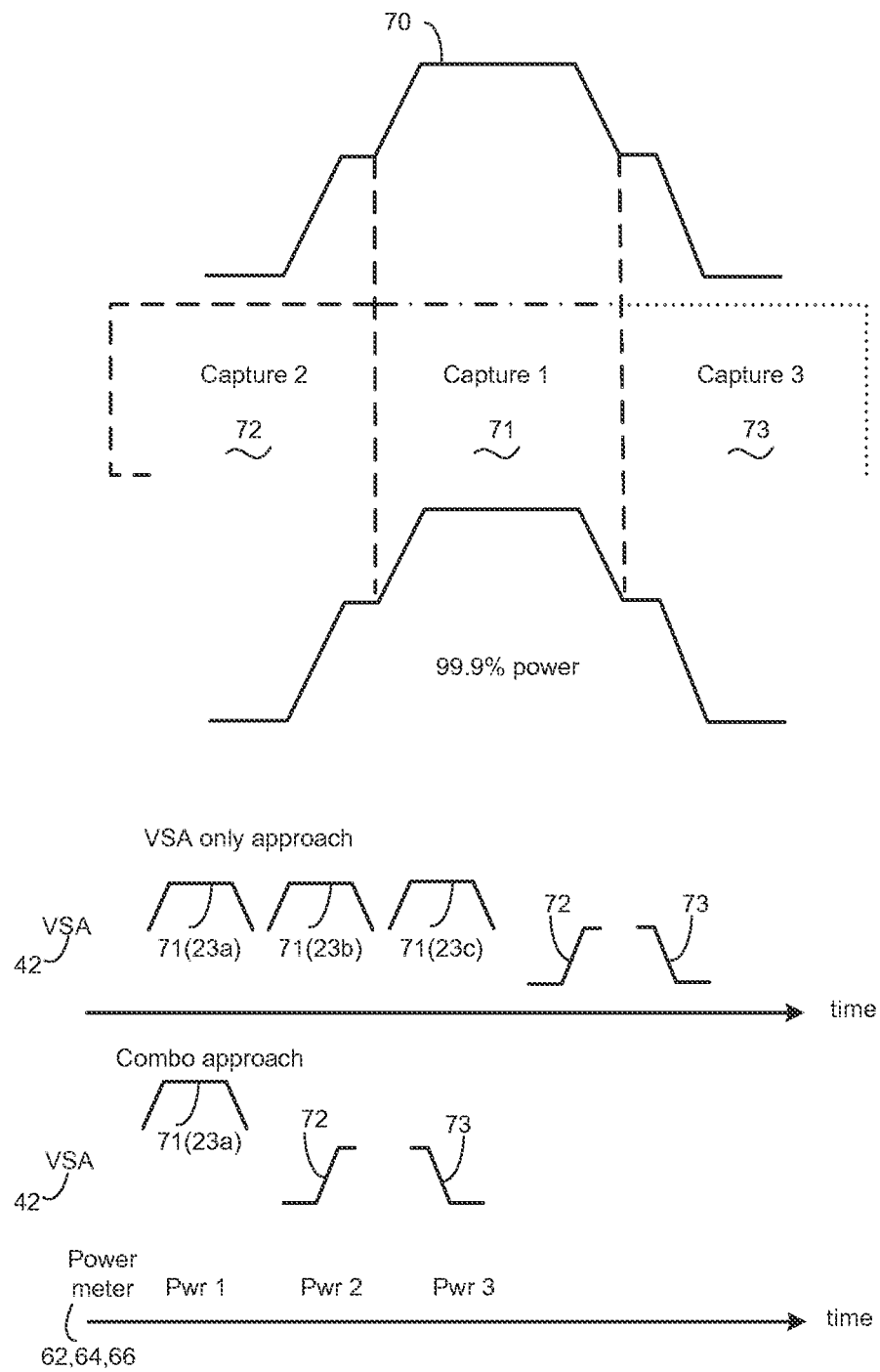
FIG. 6 depicts how test time can be reduced when performing power spectral testing using the test environment of FIG. 3.

Referring to FIG. 6, when the test environment 60 (FIG. 3), is being used for comparing signal power spectral density against a standard prescribed mask, simply conveying the test data packet signals 21a, 21b, 21c, 21d from the DUTs 20a, 20b, 20c, 20d to the VSA 42 will be adequate. However, when measuring three data packets for power as well as a wide spectral mask, using the VSA 42 would require three data packets to measure power (as discussed above). Since the VSA 42 is limited in its testing bandwidth, it cannot measure the full width of the mask 70 in a single signal capture. Accordingly, a total of three signal captures 71, 72, 73 are required to create a spectral mask measurement. Hence, five data packet signal sub-sequences will be required, with three needed for power measurement captures 71(23a), 71(23b), 71(23c) and two required for capturing the edges, or "skirts", 72, 73 of the mask 70. (Since the bandwidth of the VSA 42 is limited, full power of the test data packet signal cannot be measured, though, for all practical purposes, approximately 99.9% of the transmitted power can be measured. Hence, errors due to other signal impairments will dominate any variations compared to the missed power.)

However, as discussed above, in accordance with the presently claimed invention, the VSA 42 need only be used to measure the spectral mask 70, since dedicated power measurement circuitry 62, 64, 66 can be used to perform any desired power measurements. Hence, only three data packets sub-sequences are needed: one for the central portion of the signal mask 71(23a), and the two for the mask edges 72, 73. (This also advantageously allows for more accurate measurement of the full transmitted signal power, since the power measurement circuitry 62, 64, 66 does not suffer the same bandwidth limitations as the VSA 42. Moreover, for these examples of testing four DUTs 20a, 20b, 20c, 20d, this reduces the number of data packets needed from each DUT 20 from 20 (five packets from each of the four DUTs 20) to 12 (three packets from each of the four DUTs 20), with the minimum number of needed packets being determined by the bandwidth limitations of the VSA 42.)

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a test system for testing multiple data packet signal transceivers concurrently, comprising:
   a first signal analysis circuitry, wherein said first signal analysis circuitry, in response to a plurality of data packet signals from a plurality of data packet signal transceivers, provides one or more first analysis signals representing respective values of at least a first respective signal characteristic of at least a portion of each of said plurality of data packet signals, and each of said plurality of data packet signals includes a sequence of a plurality of data packets;

a signal routing circuitry coupled to said first signal analysis circuitry and responsive to said plurality of data packet signals and one or more control signals by providing a routed signal that includes a sequence of respective portions of each of said plurality of data packet signals; and a second signal analysis circuitry coupled to said signal routing circuitry, wherein said second signal analysis circuitry, in response to said routed signal, provides one or more second analysis signals, said one or more second analysis signals represent respective values of at least a second respective signal characteristic of each of said respective portions of each of said plurality of data packet signals within each of a plurality of signal bandwidths centered at mutually distinct signal frequencies, and said second respective signal characteristic of each of said respective portions of each of said plurality of data packet signals within each of the plurality of signal bandwidths centered at mutually distinct signal frequencies defines a respective spectral mask.

2. The apparatus of claim 1, wherein said first and second respective signal characteristics of each of said plurality of data packet signals comprises first and second respective signal power levels.

3. The apparatus of claim 1, wherein said first signal analysis circuitry comprises a signal power measurement circuitry.

4. The apparatus of claim 1, wherein said first signal analysis circuitry comprises a power detection circuitry responsive to said plurality of data packet signals by providing a plurality of detected power signals.

5. The apparatus of claim 1, wherein said first signal analysis circuitry comprises:

a power detection circuitry responsive to said plurality of data packet signals by providing a plurality of detected power signals; and an analog-to-digital conversion (ADC) circuitry coupled to said power detection circuitry and responsive to said plurality of detected power signals by providing a plurality of detected power data.

6. The apparatus of claim 1, wherein said signal routing circuitry comprises at least one of a signal splitting circuitry, a signal power divider circuitry, a signal multiplexor circuitry, a signal switching circuitry or a signal selection circuitry.

7. The apparatus of claim 1, wherein said second signal analysis circuitry comprises a vector signal analyzer (VSA).

8. A method of testing multiple data packet signal transceivers concurrently, comprising:

receiving a plurality of data packet signals from a plurality of data packet signal transceivers, wherein each of said plurality of data packet signals includes a sequence of a plurality of data packets;

measuring at least a first respective signal characteristic of at least a portion of each of said plurality of data packet signals to provide one or more first analysis signals representing respective values of said at least the first respective signal characteristic;

routing said plurality of data packet signals to provide a routed signal that includes a sequence of respective portions of each of said plurality of data packet signals; and analyzing said routed signal to provide one or more second analysis signals, wherein said one or more second analysis signals represent respective values of at least a second respective signal characteristic of each of said respective portions of each of said plurality of data packet signals within each of a plurality of signal bandwidths centered at mutually distinct signal frequencies, and said second respective signal characteristic of each of said respective portions of each of said plurality of data packet signals within each of the plurality of signal bandwidths centered at mutually distinct signal frequencies defines a respective spectral mask.

9. The method of claim 8, wherein said first and second respective signal characteristic of each of said plurality of data packet signals comprises first and second respective signal power levels.

10. The method of claim 8, wherein said measuring at least a respective scalar signal characteristic of each of said plurality of data packet signals comprises measuring a signal power of each of said plurality of data packet signals.

11. The method of claim 8, wherein said measuring at least a respective scalar signal characteristic of each of said plurality of data packet signals comprises detecting a signal power of each of said plurality of data packet signals to provide a plurality of analog detected power signals.

12. The method of claim 8, wherein said measuring at least a respective scalar signal characteristic of each of said plurality of data packet signals comprises:

detecting a signal power of each of said plurality of data packet signals to provide a plurality of analog detected power signals; and converting said plurality of analog detected power signals to a plurality of digital detected power signals.

13. The method of claim 8, wherein said routing said plurality of data packet signals to provide a routed signal that includes a sequence of respective portions of each of said plurality of data packet signals comprises at least one of splitting, power-dividing, multiplexing, switching and selecting among said plurality of data packet signals.

14. The method of claim 8, wherein said analyzing said routed signal comprises processing said routed signal with a vector signal analyzer (VSA).

* * * * *